United States Patent
Yu et al.

[11] Patent Number: 5,951,232
[45] Date of Patent: *Sep. 14, 1999

[54] ASSEMBLY FOR EXTRACTING A SPARE TIRE FROM VEHICLE STORAGE

[75] Inventors: Henry Yu, Redford; Michael Heppler, Birmingham; Robert D. Blankenship, Novi, all of Mich.

[73] Assignee: Chrysler Corporation, Auburn Hills, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/972,487

[22] Filed: Nov. 18, 1997

[51] Int. Cl.⁶ ..................................................... B62D 43/10
[52] U.S. Cl. ....................... 414/463; 224/42.21; 414/466
[58] Field of Search ............................. 224/42.12, 42.21, 224/42.23; 414/463, 465, 466

[56] References Cited

U.S. PATENT DOCUMENTS

| | | |
|---|---|---|
| 2,036,472 | 4/1936 | Grimshaw . |
| 2,091,071 | 8/1937 | Girl .................................... 224/42.21 X |
| 2,155,253 | 4/1939 | Biszantz . |
| 2,518,342 | 8/1950 | Lim . |
| 2,788,239 | 4/1957 | DeFrancesco . |
| 3,533,654 | 10/1970 | Kannegieter ...................... 224/42.21 X |
| 3,559,829 | 2/1971 | Shamel ..................................... 414/466 |
| 3,940,041 | 2/1976 | Bott . |
| 4,087,032 | 5/1978 | Miller et al. ......................... 224/42.23 |
| 4,106,681 | 8/1978 | Bott ...................................... 224/42.12 |
| 4,398,765 | 8/1983 | Ishikawa ................................ 296/37.2 |
| 4,687,124 | 8/1987 | Mahr .................................... 224/42.24 |
| 5,026,107 | 6/1991 | Hess ...................................... 296/37.2 |

FOREIGN PATENT DOCUMENTS 2 155 421  9/1985  United Kingdom ................ 224/42.21

*Primary Examiner*—Janice L. Krizek
*Attorney, Agent, or Firm*—Jennifer M. Stec

[57] ABSTRACT

An extracting assembly is used to extract a spare tire from a wheel well disposed below a load platform of a motor vehicle. The extracting assembly includes a base with a pivoting member extending out therefrom. A tire platform pivots from the pivoting member. The spare tire rests on the tire platform. When a handle which is secured to the tire platform is pulled, the tire platform pivots up and out of the wheel well. The spare tire which rests on the tire platform is pulled out of the wheel well also. The pivoting member provides mechanical advantage and supports the back half of the tire platform as it rests on the load platform while the spare tire is being removed therefrom.

9 Claims, 3 Drawing Sheets

FIG 3
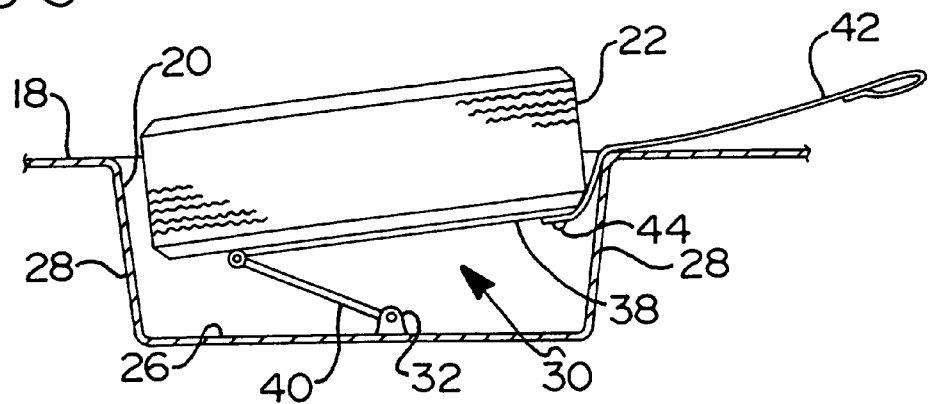
FIG 4
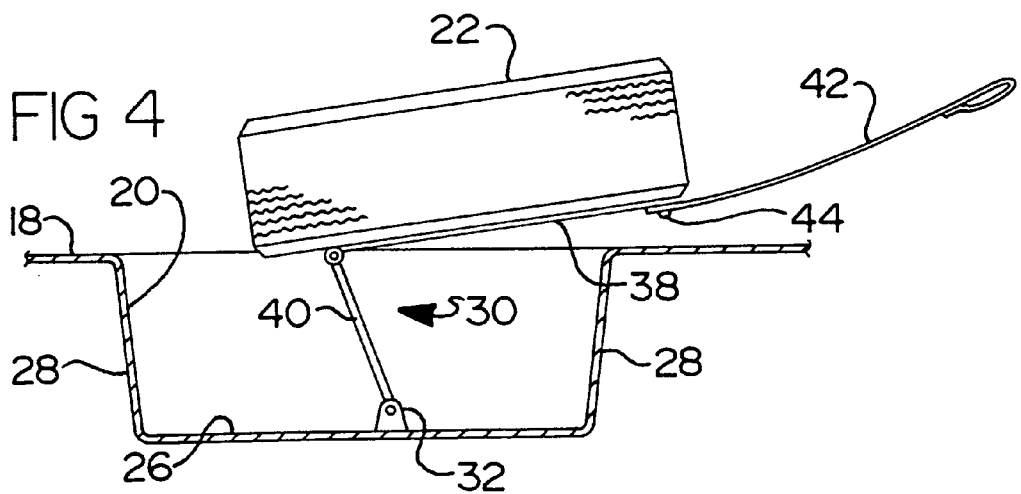
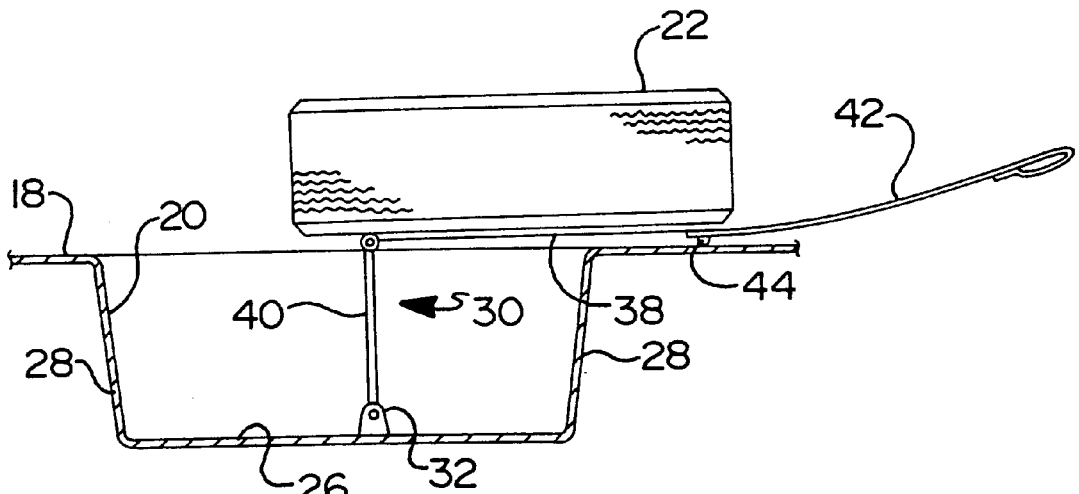
FIG 5

ASSEMBLY FOR EXTRACTING A SPARE TIRE FROM VEHICLE STORAGE

BACKGROUND OF THE INVENTION

1. Field of the Invention

The invention relates generally to vehicle attached article carriers for tires and wheels. More specifically, the invention relates to vehicle attached article carriers having extraction assemblies for tires and wheels.

2. Description of the Related Art

As the popularity of sport utility vehicles grows, so do two somewhat competing interests, namely aerodynamic styling and maximum cargo storage facilities. Sport utility vehicles are becoming sleeker. Therefore, storing a spare tire adjacent to a fender inside the decorative panel is becoming more difficult because there is less space. In addition, with the sleeker styling, cargo storage becomes a premium. As such, the spare tire must be stored in a location which minimizes the usage of cargo storage.

More and more, the spare tire is being stored under the load platform of the cargo storage facility. This creates another problem in that the spare tire must be pulled out of a wheel well located below the load platform of the cargo storage facility. Due to the increased popularity of the vehicles, more than the typical truck user is finding themselves unable to lift the spare tire out of the wheel well without much effort and soiled clothing. U.S. Pat. No. 4,106,681, issued to Bott on Aug. 15, 1978, discloses a spare tire extraction device. This extraction device includes a strap which is removably securable to the spare wheel. At the end of the strap is a handle which is used to pull the spare tire out of a wheel well designed to house a spare tire adjacent a fender in an upright position. The strap is long enough to extend the handle out beyond the spare tire from behind thereof. Although this extraction device includes a handle conveniently located in a position to minimize the amount of bending one must do to remove the spare tire, this device does not provide much mechanical advantage. More specifically, the user of the spare tire must lift the spare tire out of the wheel well without the advantage of a mechanism which will, in effect, reduce the weight thereof making it easier to lift the spare tire out of the wheel well.

SUMMARY OF THE INVENTION

An extracting assembly is disclosed for extracting a spare tire from a wheel well having a well floor and a side wall extending upwardly therefrom. The extracting assembly includes a base which is fixedly secured to the well floor. A tire platform extends between the spare tire and the well floor. The extracting assembly further includes a pivoting member pivotally secured to the base and the tire platform allowing the tire platform to pivot out of the wheel well.

One advantage associated with the invention is the ability to extract a spare tire from a wheel well. Another advantage associated with the invention is the ability to extract a spare tire from the wheel well without having to bend over any bumper structure of the vehicle. Yet another advantage associated with the invention is the ability to extract a spare tire from a wheel well with mechanical advantage minimizing the exertion force of the operator of the vehicle.

BRIEF DESCRIPTION OF THE DRAWINGS

Other advantages of the invention will be readily appreciated as the same becomes better understood by reference to the following detailed description when considered in connection with the accompanying drawings, wherein:

FIG. 3 is a partially cut away side view of one embodiment of the invention having an initial force exerted thereupon;

FIG. 4 is a partially cut away side view of one embodiment of the invention with the force continuing to be exerted thereupon;

FIG. 5 is a partially cut away side view of one embodiment of the invention in its fully extended position;

DESCRIPTION OF THE PREFERRED EMBODIMENT(S)

Figure 1:
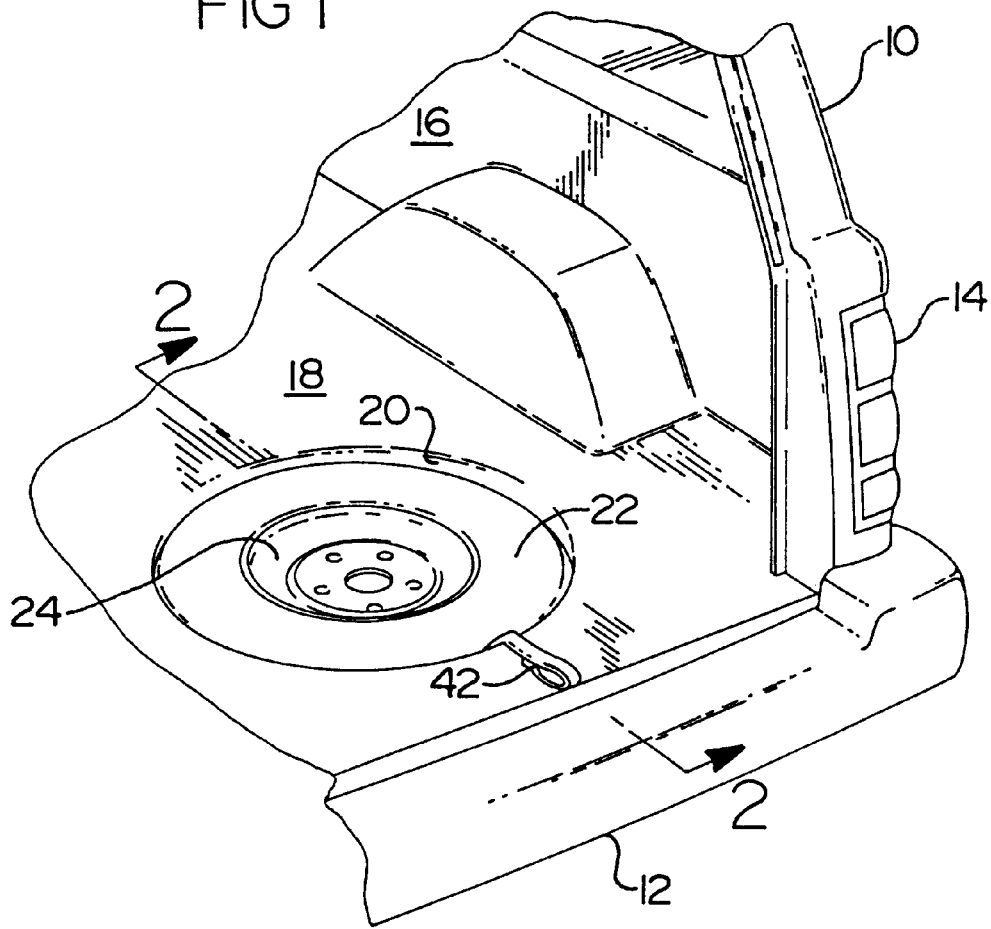
FIG. 1 is a perspective view partially cutaway of a sports utility vehicle using one embodiment of the invention.
Figure 2:
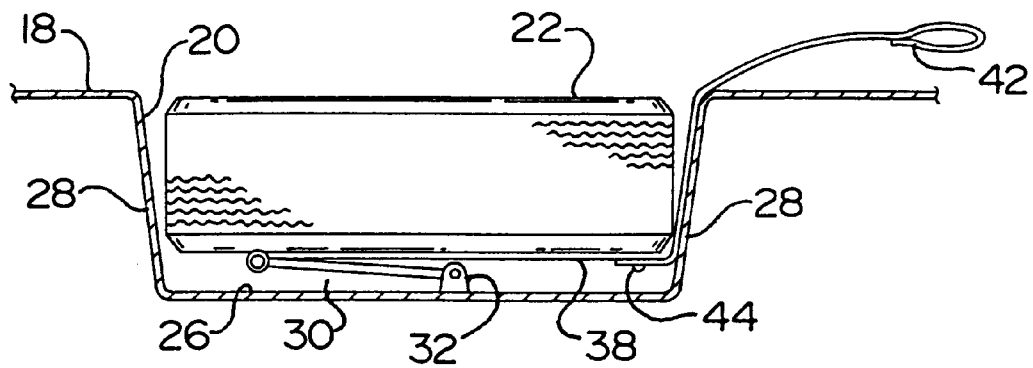
FIG. 2 is a partially cut away side view taken along line 2—2 of FIG. 1.

Referring to FIG. 1, a sport utility vehicle 10 is shown partially cut away. The sport utility vehicle 10 includes a back bumper 12, at least one back reflector 14, and an interior compartment 16. The interior compartment 16 includes a load platform 18 upon which loads of cargo may be set. A wheel well 20 extends down into the sport utility vehicle 10 below the load platform 18. Although not shown, the load platform 18 typically includes a cover which extends over the wheel well 20 when access to the wheel well 20 is not needed. The spare tire 22 includes a spare wheel 24 which engages a wheel hub (not shown). The spare tire 22 and spare wheel 24 will hereinafter be referred to merely as the spare tire 22.

Referring to FIGS. 2 through 5 and FIG. 7, wherein like prime numerals represent similar structures and differing embodiments, the load platform 18 and wheel well 20 are shown in cross-section. The wheel well 20 includes a well floor 26 and at least one side wall 28. In the embodiment shown in the Figures, the side wall 28 is a single side wall extending around the periphery of the wheel well 20. The side wall 28 extends between the well floor 26 and the load platform 18. The spare tire 22 rests inside the wheel well 20 when it is not needed.

The extraction assembly is generally indicated at 30 in FIGS. 2 through 5. The extraction assembly 30 extracts the spare tire 22 from the wheel well 20. The extraction assembly 30 includes a base 32. The base 32 is fixedly secured to the well floor 26. The base 32 may include a single structure, as shown in FIGS. 2 through 5. Alternatively, the base 32' of the alternative embodiment shown in FIGS. 6 through 7 may include two structures, one on either side of the spare tire 22'. In the alternative embodiment, the base 32' includes two flanges 34' having holes to receive a fastener (not shown) therethrough to secure the base 32' to a portion of the side wall 28'. A stop 36' prevents the extraction assembly 30' from extending beyond a position discussed subsequently.

The extracting assembly 30 further includes a tire platform 38. In the embodiment shown in FIGS. 2 through 5, the tire platform is a solid inflexible structure. In a second embodiment shown in FIGS. 6 through 7, the tire platform 38' is fabricated from a flexible material such as a woven fabric. The tire platform 38 extends between the spare tire 22 and the well floor 26 when the spare tire 22 is inside the wheel well 20. More specifically, the spare tire 22 rests on the tire platform 38. The tire platform 38 is movable and is used to move the spare tire 22 out of the wheel well 20.

Figure 6:
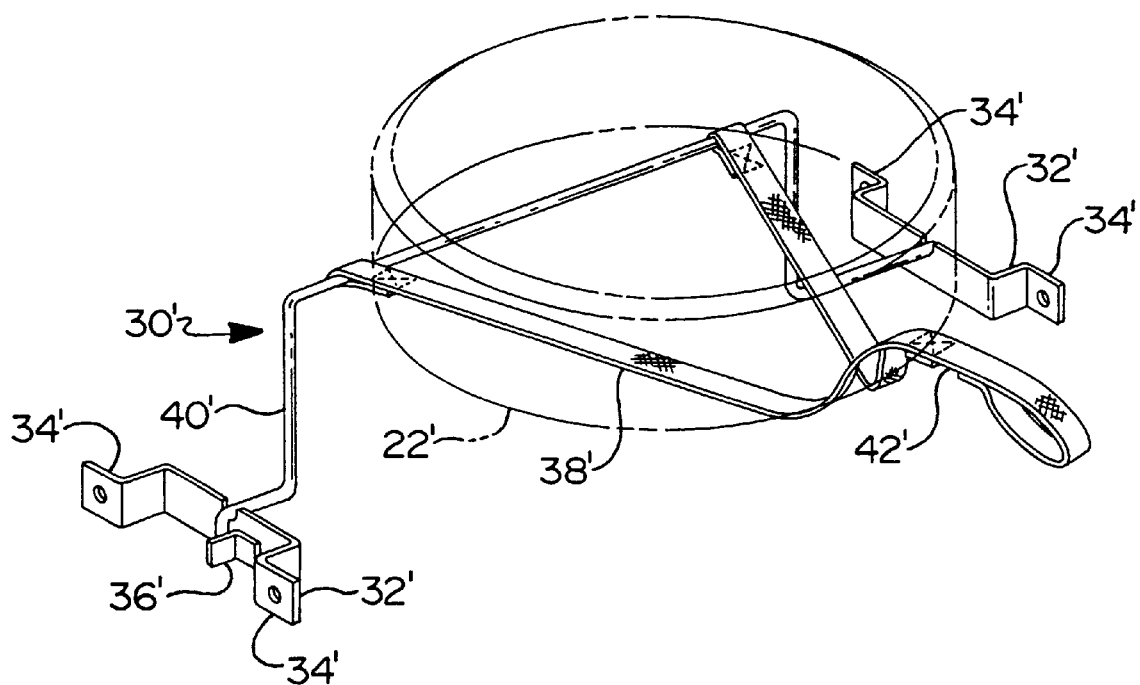
FIG. 6 is a perspective view of an alternative embodiment of the invention with a spare tire shown in phantom.
Figure 7:
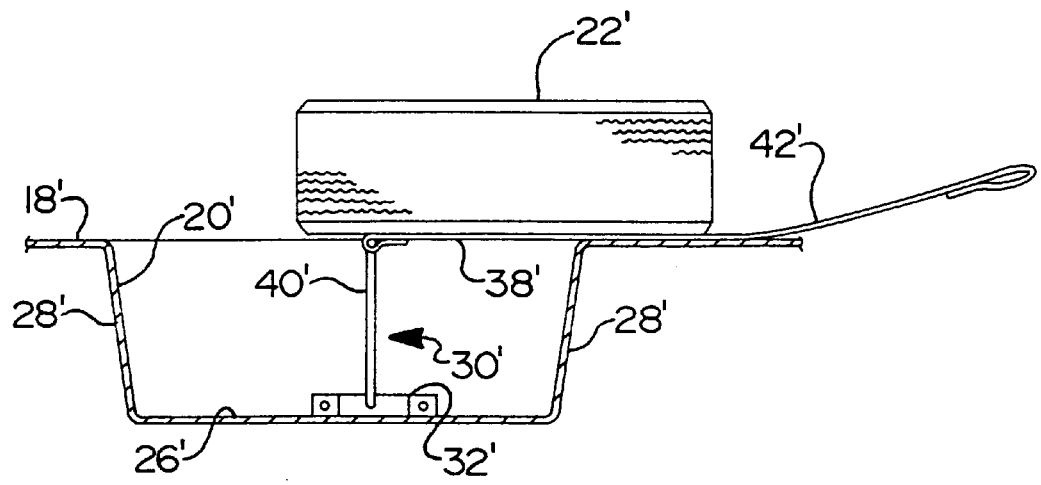
FIG. 7 is a partially cut away side view of the alternative embodiment in the fully extended position.

One or more pivoting members 40 is each pivotally secured to its own base 32 as well as the tire platform 38. The pivoting members 40 allow the tire platform 38 to pivot out of the wheel well 20. The pivoting member 40 may be a single arm, multiple arms, or, as is shown in FIG. 6, a U-shaped structure used to provide balance and physical support for the spare tire 22'. The U-shaped pivoting member 40' is used when the tire platform 38' is flexible. Regardless of the shape of the pivoting members 40, the pivoting members 40 each have a length approximately equal to the length of the side wall 28. This insures that when the pivoting members 40 are perpendicular to the well floor 26, the spare tire 22 is generally flat or co-planar with the load platform 18.

A handle 42 is fixedly secured to the tire platform 38 with a fastener 44. The handle 44 provides additional mechanical advantage by removing the requirement for the operator to bend over to lift the spare tire 22 out of the wheel well 20. In the second embodiment, the handle 42' extends out of the flexible tire platform 38'.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

What is claimed is:

1. An extracting assembly for extracting a spare tire from a wheel well disposed within a load platform having a well floor disposed below the load platform and a well side wall extending between the well floor and the load platform, said extracting assembly comprising:

a base fixedly secured to the wheel well;

a pivoting member comprising a base engaging end and a platform engaging portion, said base engaging end pivotally secured to said base;

a tire platform pivotally secured to said platform engaging portion of said pivoting member, said tire platform being disposed adjacent to said well floor in a tire storage position and being movable upward relative to said well floor to a tire extraction position disposed adjacent to said load platform; and a handle extending out from said tire platform to receive a pulling force to pivot and pull said tire platform out of the wheel well.

2. An extracting assembly as set forth in claim 1 wherein said pivoting member includes a second base engaging end such that said base engaging end and said second base engaging end extend out from said platform engaging portion.

3. An extracting assembly as set forth in claim 2 wherein said base includes first and second base ends.

4. An extracting assembly as set forth in claim 3 wherein each of said first and second base ends includes a pivot stop to prevent said pivoting member from pivoting therepast.

5. An extracting assembly as set forth in claim 1 wherein said tire platform includes at least two straps pivotally bound to said platform engaging portion.

6. A vehicle cargo storage area comprising:

a load platform including a wheel well having a well floor and a side wall extending upwardly from said well floor to said load platform and an extracting assembly including:

a base fixedly secured to the wheel well;

a pivoting member pivotally attached to said base;

a tire platform secured to said pivoting member, said tire platform being disposed adjacent to said well floor in a tire storage position and being movable upward relative to said well floor to a tire extraction position disposed adjacent to said load platform; and a handle attached to said tire platform to receive a pulling force to pivot and pull said tire platform out of said wheel well.

7. A vehicle cargo storage area as set forth in claim 6 wherein said base includes a stop preventing said pivoting member from pivoting therepast.

8. A vehicle cargo storage area as set forth in claim 6 wherein said tire platform includes an inflexible member.

9. A vehicle cargo storage area as set forth in claim 6 wherein said tire platform includes a plurality of flexible members.

* * * * *